Patented Dec. 9, 1941

2,265,688

UNITED STATES PATENT OFFICE 2,265,688

PHENOL-ALDEHYDE-BENZOYLSULPHIMIDE CONDENSATION PRODUCT

Gaetano F. D'Alelio and Joe B. Holmes, Pittsfield, Mass., assignors to General Electric Company, a corporation of New York No Drawing. Application December 1, 1939, Serial No. 307,145

17 Claims. (Cl. 260—51)

This invention relates to new condensation products and to methods of making the same. The invention is concerned more particularly with resinous compositions and plastic masses obtained by intercondensing ingredients comprising a benzoylsulphimide, an aldehyde and a phenol. These resinous condensation products are suitable for laminating, molding, casting, coating and adhesive applications, as well as for other purposes.

A preferred embodiment of the invention comprises the production and utilization of resinous bodies formed by intercondensing ingredients comprising a benzoylsulphimide, an aliphatic aldehyde such as formaldehyde and a monophenol (monohydric phenol) containing at least two reactive positions in the benzene nucleus.

In carrying the present invention into effect we may use benzoylsulphimide itself,

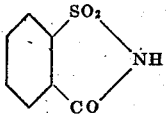

homologues of benzoylsulphimide, substituted benzoylsulphimide, or substituted homologues of benzoylsulphimide. For example, we may use the alkyl benzoylsulphimides, e. g., the methyl, the ethyl, the propyl, the butyl, the amyl, the allyl, the methallyl, the crotyl benzoylsulphimides, etc.; the alkylene dibenzoylsulphimides such as the methylene, the ethylene, the propylene, the butylene, etc., dibenzoylsulphimides; the aryl benzoyl sulphimides, e. g., the phenyl, the tolyl, the xylyl, the naphthyl benzoylsulphimides, etc.; the arylene dibenzoylsulphimides, e. g., phenylene dibenzoylsulphimide, etc.; the polynuclear aromatic sulphimides such as the naphthoylsulphimides, etc.; the benzoylsulphimides and the naphthoylsulphimides in which one or more of the ring hydrogens have been replaced by a substituent group such as halogeno, hydroxy, alkoxy, carboxy, carbalkoxv, aceto, acyloxy, nitro, amino, carbamido, furfuryl, etc., illustrative examples of which are the chlorobenzoylsulphimides, the chloronaphtholysulphimides, the hydroxybenzoylsulphimides, the hydroxynaphthoylsulphimides, the methoxybenzoylsulphimides, the ethoxybenzoylsulphimides, the carboxybenzoylsulphimides, the carboxynaphthoylsulphimides, the carbethoxybenzoylsulphimides, the carbmethoxynaphthoylsulphimides, the acetobenzoylsulphimides, the propionaphthoylsulphimides, the acetoxybenzoylsulphimides, the acetoxynaphthoylsulphimides, the nitrobenzoylsulphimides, the nitronaphthoylsulphimides, the aminobenzoylsulphimides, the aminonaphthoylsulphimides, the carbamidobenzoylsulphimides, the carbamidonaphthoylsulphimides, the furfurylbenzoylsulphimides, the furfurylnaphthoylsulphimides, etc.; and similar substances. In general, the only requirement of the benzoylsulphimide component is that it contain the imide structure

Terms such as "a benzoylsulphimide," "benzoylsulphimide component" and "benzoylsulphimide substance," as used generally herein and in the appended claims, are intended to include within their meaning substances of the kind mentioned above by way of illustration.

When a phenol and an aldehyde, specifically formaldehyde, are condensed in the presence of a substance having basic properties such as sodium hydroxide and thereafter converted to the insoluble, infusible state in accordance with conventional practice, a purplish resin usually results. We have discovered that when a benzoylsulphimide is intercondensed with a phenol and an aldehyde such as formaldehyde under similar conditions, the purplish color is completely eliminated and a very light-colored resin usually is obtained. This discovery is of considerable practical importance, since it provides a convenient and economical method of producing certain light-colored resinous bodies not obtainable without the use of a benzoylsulphimide.

In producing the new condensation products of this invention the phenol component may be, for instance, phenol itself, $C_6H_5OH$, or its homologues such as the ortho, meta and para cresols, the xylenols, etc.; higher alkyl phenols such as meta ethyl phenol, para tertiary butyl phenol, para tertiary amyl phenol, etc.; aryl phenols such as the ortho, meta and para phenyl phenols, the ortho, meta and para benzyl phenols, phenyl phenol ethane, polyhydric phenols, e. g., resorcinol, pyrogallol, para para prime dihydroxy diphenyl propane, the nuclearly alkylated and arylated derivatives of the polyhydric phenols, etc.; or mixtures of such aldehyde-reactable phenolic bodies.

Our new intercondensation products in which the phenol component is a para- or ortho-substituted monophenol containing four or more carbon atoms in the substituent grouping (that is, monohydric phenols substituted in the ortho or para positions by a hydrocarbon substituent containing at least four carbon atoms) are soluble in oils, as for example drying and semi-drying fatty oils, and in such form, with or without further heat treatment of the oily solution of the resinous condensation product, may be used in the production of coating compositions such as varnishes, enamels, lacquers, etc. Examples of substituted phenols yielding oil-soluble intercondensation products are butyl phenols, amyl phenols, indene phenols, coumar phenols, phenyl phenols, 2-ethylhexyl phenols, terpene phenols, symmetrical phenyl phenol alkanes, styryl phenols, the nuclearly alkylated styrene phenols, the nuclearly alkylated phenyl phenol alkanes, the nuclearly phenylated phenyl phenol alkanes, and the like.

In general, the only requirement of the phenolic component in producing the new phenol-aldehyde-benzoyl-sulphimide intercondensation products of this invention is that it be capable of undergoing condensation with an aldehyde. Terms such as "a phenol," "phenol component," "phenolic substance" and "phenolic body," as used generally herein and in the appended claims, are intended to include within their meaning aldehyde-reactable phenols of the kind above mentioned by way of illustration.

In producing the condensation products of this invention the choice of the aldehydic component is dependent largely upon economic considerations and upon the particular properties desired in the finished product. We prefer to use as the aldehydic component formaldehyde or compounds engendering formaldehyde such as paraformaldehyde, hexamethylenetetramine, etc. For some applications we may use, for instance, acetaldehyde, propionaldehyde, butyraldehyde, acrolein, methacrolein, crotonaldehyde, benzaldehyde, mixtures thereof, or mixtures of formaldehyde (or compounds engendering formaldehyde) with such aliphatic or aromatic aldehydes. In general the longer the chain of the aliphatic aldehyde, the slower is the cure of the resinous condensation product and the softer is the final product.

In carrying the present invention into effect the condensation reaction between the components may be carried out at normal or at elevated temperatures, in the presence or absence of a condensation catalyst and under alkaline, neutral or acid conditions. Neutral conditions may be established by neutralizing (if necessary) either the mixed components or the individual component or components prior to admixture. Any substance yielding an alkaline aqueous solution may be used in obtaining alkaline conditions for the initial condensation reaction. In some cases it may be desirable, in order more quickly to initiate reaction between the starting materials, to add a small amount of a suitable organic or inorganic acid. Thereafter the solution is treated to eliminate acidic conditions due to acid or acid salts. That is, the mass is neutralized or is made alkaline by adding an alkaline substance. The reaction is then caused to proceed further to produce the condensation products of this invention.

In obtaining the neutral, alkaline or acid conditions above described we may use, for example, ammonia, sodium hydroxide or carbonate, calcium hydroxide, methyl amine, diethyl amine, tri-isopropyl amine, ethanol amines, tri-isopropanol amine, etc., mixtures of such alkaline (basic) substances, inorganic or organic acids such as hydrochloric, sulphuric, phosphoric, acetic, acrylic, crotonic, malonic, etc., or acid salts such as sodium acid sulphate, monosodium phosphate, monosodium phthalate, etc., or mixtures of acids, of acid salts, or of acids and acid salts.

Various ways may be employed for effecting initial reaction between the components. For example, we may first mix all the reactants and effect condensation between the mixed reactants in the presence or absence of addition agents, as for instance, condensation catalysts, fillers, plasticizers, other natural or synthetic resinous bodies, solvents or diluents, etc. Alternatively, we may add the benzoylsulphimide component to a partial condensation product of an aldehyde with a phenol and effect further condensation between the components. Or, we may first condense the benzoylsulphimide component with an aldehyde, add the resulting product to a partial condensation product of an aldehyde and a phenol, or to a mixture of different partial condensation products, and then cause the reaction to proceed further. Or, we may condense or partially condense the benzoylsulphimide substance with a molecular excess of an aldehyde, add a phenol to the condensation product and effect further reaction between the components. Still other ways may be employed in combining the components and in producing the unmodified or modified condensation product of this invention, as will be readily understood by those skilled in the art as the description of the invention proceeds. These condensation reactions may proceed under a wide variety of time, temperature and pressure conditions. The temperature of reaction may vary from room temperature to the reflux temperature of the reactants at reduced, atmospheric or superatmospheric pressures.

The intermediate condensation products of a benzoylsulphimide with an aliphatic aldehyde and a reactive phenol are heat-convertible (heat-curable) resinous bodies which alone or mixed with fillers, pigments, dyes, lubricants, plasticizers, etc., may be used, for example, as molding compositions. The modified or unmodified resinous masses can be converted (hardened) under heat or under heat and pressure to the insoluble, infusible state. Depending upon the particular reactants employed and the particular conditions of reaction, these intermediate condensation products vary from clear, nearly colorless (or colored), syrupy, water-soluble liquids to viscous, milky (or clear) dispersions or solutions and gel-like masses of decreased solubility in ordinary solvents such as alcohol, glycol, glycerine, water, etc. These liquid intermediate condensation products may be concentrated or diluted further by the removal or addition of volatile solvents to form liquid coating compositions of adjusted viscosity and concentration. The liquid compositions may be used, for instance, as surface coating materials, in the production of paints, varnishes, lacquers, enamels, etc., for general adhesive applications, in producing laminated articles and for numerous other purposes. The liquid intermediate condensation products also may be used directly as casting resins. Certain of the intermediate condensation products may be dried and granulated, if desired, to form clear or opaque, unfilled, heat-convertible resins.

In carrying the present invention into effect imides such as succinimide and phthalimide are not the equivalent of a benzoylsulphimide, as their use yields resinous compositions of only limited application as compared with the resinous condensation products obtained when a benzoylsulphimide constitutes one of the reactants.

In order that those skilled in the art better may understand how the present invention may be carried into effect, the following examples are given by way of illustration. All parts are by weight.

*Example 1*

|  | Parts |
|---|---|
| Phenol | 90.0 |
| Aqueous formaldehyde (37.1%) | 161.0 |
| Benzoylsulphimide | 2.0 |
| Sodium hydroxide in 5 parts water | 0.9 |

The above components, with the exception of the benzoylsulphimide, were mixed and heated under reflux for 30 minutes. To the phenol-formaldehyde condensation product thus obtained was added the stated amount of benzoylsulphimide, 83 parts alpha flock and 0.5 part zinc stearate to form a molding composition. The moist compound was heated first at 50° C. and then for a short time at 85° C. to effect further condensation between the components simultaneously with drying. The resulting composition was molded at about 130–135° C. under a pressure of approximately 2000–3000 pounds per square inch. The molded articles were well-cured and were of a yellowish color.

A molding compound produced as described above, but using 87 instead of 83 parts alpha flock and without incorporating benzoylsulphimide into the resin during the preparation of either the resin or the molding composition, yielded molded articles of a dark purplish-brown color.

*Example 2*

Same formula as in Example 1 with the exception that 6 parts benzoylsulphimide were employed. The phenol and formaldehyde were refluxed in the presence of the sodium hydroxide for 30 minutes, after which the benzoylsulphimide was added and the resulting mass dehydrated by distilling under a vacuum of 27 inches to an internal temperature of 90° C. The clear resin was cast into molds and cured at an elevated temperature, specifically about 85° C. for about 68 hours. The cured resin was ivory-white and opaque. Casting resins of this invention conveniently may be cured by heating at, for example, from about 65° to 130° C.

*Example 3*

Essentially the same procedure was followed as described under Example 2 with the exception that after the resin was substantially completely dehydrate, it was diluted with ethyl alcohol. Fibrous sheet material, specifically paper, was coated and impregnated by immersing it in the alcoholic solution of the resin. The impregnated sheets were dried to remove the solvent. The dried sheets contained approximately 60% resin. The sheets or layers were superposed and bonded together by heating in a suitable mold to 135° C. under a pressure of about 1500 pounds per square inch for about 30 minutes. The temperature was allowed to drop to 30° C. before the pressure was released. The laminated articles were very light in color, had a good gloss, and excellent resistance to solvents.

In a similar manner the resin-impregnated sheets were bonded to wood blocks and other articles to form veneered articles. The resinous composition of this example is particularly suitable for bonding together wooden blocks, wood veneers, and other articles of wood.

*Example 4*

Same formula as in Example 1 with the exception that 6 parts benzoylsulphimide were employed and the initial condensation reaction between the phenol and the formaldehyde in the presence of the sodium hydroxide was carried out for 1 hour before adding the 6 parts benzoylsulphimide. The resulting mass was dehydrated by distilling under a vacuum of 27 inches to an internal temperature of 90° C. Twelve (12) parts glycerine were incorporated into the substantially completely dehydrated resin prior to use. The glycerine-modified resin was cast into molds and cured therein at about 85° C. for approximately 65 hours. The cured resin was hard, clear, a very light color and machined well.

It will be understood, of course, that benzoylsulphimides (illustrative examples of which previously have been given) other than benzoylsulphimide itself may be used in producing the new condensation products of this invention, and that the above examples merely are by way of illustration. In some cases, too, it may be advantageous to use a single benzoylsulphimide with a plurality of different phenols. In other cases, we may use a plurality of benzoylsulphimides with a single phenol or a plurality of phenols.

The ratio of the reactants to each other may be considerably varied but, in general, it is desirable to use at least one mole of an aldehyde for each mole of a benzoylsulphimide or of mixed (total) benzoylsulphimide substance and phenol. Ordinarily not exceeding substantially ¼ mole of a benzoylsulphimide is used for each mole of methylol-forming organic compound, specifically a phenol.

For molding applications the ratio of the aldehydic component to the total amount of benzoylsulphimide substance and phenol also may be considerably varied, but generally will be within the range of 1 to 3 moles of aldehyde for each mole of total benzoylsulphimide substance and phenol. The use of higher amounts of aldehyde is not precluded, but no particular advantages appear to accrue therefrom. Approximately 1.1–1.5 (as a lower limit depending upon the particular reactants) up to 2.5 moles aldehyde per mole of the component to be reacted therewith usually gives very satisfactory results, particularly from the viewpoint of optimum yields of condensation product per unit cost.

The fundamental resins of this invention (specifically resinous reaction products of ingredients comprising the following components in the stated molar ratios: one mole of a phenol, at least one mole of an aldehyde, e. g., formaldehyde, and not exceeding substantially one-fourth mole of a benzoylsulphimide) may be varied widely by introducing other modifying bodies before, during or after effecting condensation between the primary components. Thus, as modifying agents we may use, for example, monohydric alcohols such as ethyl, propyl, butyl, amyl, etc.; polyhydric alcohols such as ethylene glycol, diethylene glycol, glycerol, pentaerythritol, trimethylol nitro methane, etc.; monoamides such as foramide, acetamide, stearamide, acrylic acid amides (acryloamides), benzamide, toluene sulphonamide, etc.; polyamides such as urea, thiourea, adipic diamide, phthalamide and the like; amines such as ethylene diamine, aniline, phenylene diamine, amino phenols; etc.

The modifying bodies also may take the form of high molecular weight bodies with or without resinous characteristics, for example partially hydrolyzed wood products, lignin, protein-aldehyde condensation products, aniline-aldehyde condensation products, modified or unmodified, saturated or unsaturated polybasic acid-polyhydric alcohol condensation products, sulphonamide-aldehyde resins, water-soluble celulose derivatives, natural gums and resins such as copal, shellac, rosin, etc.; polyvinyl compounds such as polyvinyl alcohol, polyvinyl esters such as the acetate, polyvinyl acetals such as polyvinyl formal, etc.

Other modifying agents of a plasticizing or softening nature also may be incorporated into the condensation products of this invention. Examples of such modifying agents are the phthalate esters, for instance dimethyl phthalate, diethyl phthalate, dibutyl phthalate, etc., the phosphate esters such as tricresyl phosphate, triphenyl phosphate, etc. Mold lubricants such as the metallic soaps of the high molecular weight fatty acids, for example the stearates and palmitates of tin, zinc, etc., waxes such as carnauba, high melting point paraffin waxes, etc., may be added to facilitate molding of the compositions. Dyes, pigments, etc., may be added to alter the visual appearance of the finished product. Various fillers may be used to provide a wide variety of molding compositions. The choice of the filler depends upon the particular application for which the molded article is to be used. As fillers may be used, for instance, bleached or unbleached wood flour, alpha cellulose in flock form, sheets or cuttings of paper, cloth, canvas, etc., asbestos in powdered or long or short fiber length, powdered or flaked mica, wood chips, short or long wood fibers, synthetic or natural continuous threaded fibers, glass fibers in continuous filament or fabric (woven or felted) form, etc.

In the preparation of molding compositions from the resinous bodies of this invention, the non-dehydrated or the partially dehydrated resins may be compounded with the above addition agents in accordance with procedures well known to those skilled in the plastics art. The wet composition may be dried in the usual manner either at normal (room) temperature or at elevated temperatures in a preheated stream of air or under the influence of reflected heat energy. The dried compound may be densified through the usual processes of working in a Banbury mixer, or by rolling, pelleting or other means, followed by grinding and screening to the desired particle size. These molding compositions may be molded at elevated temperatures and at suitable pressures. When the color of the finished product is of lesser importance, molding temperatures may be as high as 175° C. When the color of the molded article is important, the molding temperature generally will not exceed substantially 150° C. The lower limit of molding temperature in forming shaped, compressed articles from the resinous bodies of this invention is usually of the order of 100° C. The molding pressures generally range between about 1000 and 4000 pounds per square inch.

The modified or unmodified products of this invention may be used, for instance, in making buttons, clock cases, radio cabinets, decorative novelties and various other cast and molded articles of manufacture. They also may be used as impregnants for electrical coils and other electrical devices, as sizings and water repellants for wood, silk, cotton, wool, synthetic organic fibers, etc., in continuous filament, thread, fabric or other form, as modifying agents for other resinous bodies, and for other purposes.

What we claim as new and desire to secure by Letters Patent of the United States is:

1. A composition comprising the resinous reaction product of ingredients comprising the following components in the stated molar ratios: one mole of a phenol, at least one mole of an aldehyde and not exceeding substantially one-fourth mole of a benzoylsulphimide.

2. A composition comprising a resinous condensation product as in claim 1 wherein the aldehyde is an aliphatic aldehyde.

3. A composition comprising the alcohol-modified condensation product of a benzoylsulphimide, an aliphatic aldehyde and a phenol in the molar ratios of at least one mole of the aliphatic aldehyde and not exceeding substantially one-fourth mole of the benzoylsulphimide for each mole of the phenol.

4. A resinous composition comprising a condensation product of ingredients comprising the following components in the stated molar ratios: one mole of a phenol, at least one mole of formaldehyde and not exceeding substantially one-fourth mole of a benzoylsulphimide.

5. A resinous composition comprising a condensation product of ingredients comprising the following components in the stated molar ratios: one mole of a monohydric phenol, at least one mole of formaldehyde and not exceeding substantially one-fourth mole of benzoylsulphimide.

6. A composition comprising the resinous product of reaction under alkaline conditions, of ingredients comprising the following components in the stated molar ratios: one mole of a phenol, at least one mole of an aliphatic aldehyde and not exceeding substantially one-fourth mole of a benzoylsulphimide.

7. A resinous condensation product of a benzoylsulphimide, an aldehyde and a phenol containing at least two reactive positions in the benzene nucleus in the molar ratios of at least one mole of the aldehyde and not exceeding substantially one-fourth mole of the benzoylsulphimide for each mole of the phenol.

8. A heat-curable, resinous composition comprising an intermediate condensation product of the following components in the stated molar ratios: one mole of a phenol, at least one mole of an aliphatic aldehyde and not exceeding substantially one-fourth mole of a benzoylsulphimide.

9. A resinous composition comprising a condensation product of the following components in the stated molar ratios: one mole of a monohydric phenol, at least one mole of formaldehyde and not exceeding substantialy one-fourth mole of a benzoylsulphimide.

10. A product comprising the cured resinous composition of claim 8.

11. A heat-hardenable molding composition comprising a filler and a heat-hardenable resinous condensation product of ingredients comprising the following components in the stated molar ratios: one mole of phenol, not exceeding substantially one-fourth mole of a benzoylsulphimide, and formaldehyde in a molar amount corresponding to from one to three moles formaldehyde for each mole of total benzoylsulphimide and phenol.

12. An article of manufacture comprising the heat-hardened molding composition of claim 11.

13. A method of producing resinous compositions which comprises reacting to resin formation the following components in the stated molar ratios: one mole of a phenol containing at least two reactive positions in the benzene nucleus, at least one mole of an aliphatic aldehyde and not exceeding substantially one-fourth mole of a benzoylsulphimide.

14. The method of preparing a resinous composition which comprises effecting reaction, until a resin is formed, between ingredients comprising the following components in the stated molar ratios: one mole of a phenol, at least one mole of an aldehyde and not exceeding substantially one-fourth mole of a benzoylsulphimide.

15. A heat-curable casting resin which is the dehydrated reaction product of (1) a benzoylsulphimide and (2) an alkaline-catalyzed partial condensation product of ingredients comprising phenol and formaldehyde in the molar ratio of one mole of the former to at least one mole of the latter, the molar amount of the benzoylsulphimide reactant not exceeding substantially one-fourth mole for each mole of the phenol component of the said partial condensation product.

16. The cured resin of claim 15.

17. An oil-soluble resinous composition comprising the resinous reaction product of ingredients comprising the following components in the stated molar ratios: (1) one mole of a monohydric phenol substituted in the para position by a hydrocarbon substituent containing at least four carbon atoms, (2) at least one mole of an aliphatic aldehyde and (3) not exceeding substantially one-fourth mole of a benzoylsulphimide.

GAETANO F. D'ALELIO.
JOE B. HOLMES.